United States Patent Office 3,501,505
Patented Mar. 17, 1970

3,501,505
1 - AMINO - 4[4'α,β-DIBROMOPROPIONYLAMINO AND α - BROMOACRYLAMINO)-ANILINO] - 2,2'-ANTHRAQUINONEDISULFONIC ACIDS
Arthur Buehler, Rheinfelden and René de Montmollin, Riehen, Switzerland, assignors to Ciba Limited, Basel, Switzerland, a company of Switzerland
No Drawing. Filed Nov. 1, 1966, Ser. No. 591,109
Claims priority, application Switzerland, Nov. 11, 1965, 15,570
Int. Cl. C09b 1/40
U.S. Cl. 260—372                   3 Claims

ABSTRACT OF THE DISCLOSURE

Dyestuffs of the anthraquinone series which correspond to the formula:

(1)
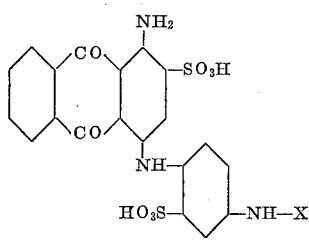

wherein X is either α,β-dibromopropionyl or α-bromoacryl fiber reactive radical, are suitable for dyeing a wide variety of materials and in particular polyhydroxylated fibrous materials, cellulose and nitrogenous textile materials to provide dyeings of outstanding light and wet fastness properties.

---

This invention relates to new dyestuffs of the anthraquinone series which correspond to the formula (1)
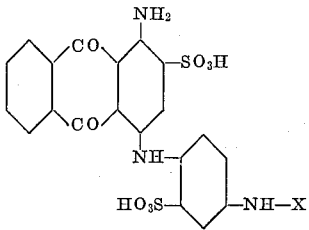

in which X represents a fiber-reactive, preferably aliphatic, acyl radical linked through a —CO— group to the —NH— bridge, for example a dichloroquinoxaline carboxylic acid radical, a dichlorophthalazine carboxylic acid radical, a dichloropyridazone propionic acid radical, 2-chlorobenzthiazole carboxylic acid radical, or especially a mono- or dihalogenpropionyl radical, halogencrotonyl radical, acryl or halogenacryl radical.

These dyestuffs can be prepared by acrylation, splitting off hydrogen halide or introduction of a sulfo group. For example, the anthraquinone dyestuffs of the formula (2)
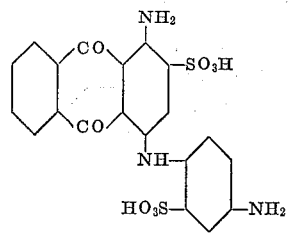

can be acylated according to this invention with a halide or anhydride of a carboxylic acid containing a fiber-reactive, preferably aliphatic, acyl radical. Examples of such acylating agents are halides of a dihalogenquinoxaline carboxylic acid, for example 2-chloroquinoxaline- or 2-bromoquinoxaline-3-carboxylic acid chloride or 2-chloroquinoxaline- or 2-bromoquinoxaline-3-carboxylic acid bromide, halides or a dihalogenpyrimidine carboxylic acid, for example 2,4-dichloropyrimidine- or 2,4-dibromopyrimidine-5-carboxylic acid chloride or 2,4-dichloropyrimidine- or 2,4-dibromopyrimidine-5-carboxylic acid bromide, 2,4-dichloropyrimidine- or 2,4-dibromopyrimidine - 6 - methyl-5-carboxylic acid chloride, 2,4-dichloropyrimidine- or 2,4-dibromopyrimidine-6-methyl-5-carboxylic acid bromide, 2,6-dichloropyrimidine- or 2,6-dibromopyrimidine-4-carboxylic acid chloride or 2,6-dichloropyrimidine- or 2,6 - dibromopyrimidine - 4-carboxylic acid bromide, halides of a dichlorophthalazine carboxylic acid, dichloropyridazonepropionic acid or 2-chlorobenzthiazole carboxylic acid; also dichloropropionic acid anhydride or especially dichloropropionic acid halides, acrylic acid halides, halogen acrylic acid halides, e.g., α-bromacrylic acid chloride.

The anthraquinone dyestuff used as starting material can be prepared as described in French Patent No. 1,079,795 followed by hydrolysis, or by direct sulfonation of 1 - amino-(4' -aminophenylamino)-anthraquinone-2-sulfonic acid, or by condensation of 1-amino-4- bromanthraquinone - 2-sulfonic acid with 4-acetaminoaniline-2-sulfonic acid followed by hydrolysis.

The acylation according to this invention of the aforementioned anthraquinone dyestuff with these anhydrides or halides is performed advantageously in the presence of an acid-binding agent, such as sodium acetate, sodium hydroxide or sodium carbonate, preferably in an aqueous medium. In many cases it is advantageous to use an excess of the acylating agent and to perform the acylation at a pH value between 5 and 8.

According to one modification of the present process, the anthraquinone dyestuff of the formula (3)
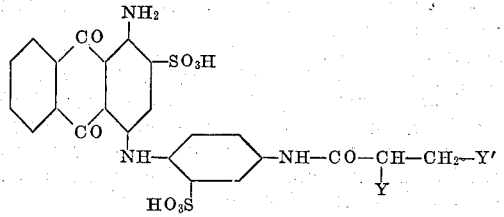

in which Y' represents a halogen atom, especially a bromine atom, and Y stands for a hydrogen or halogen atom, can be treated with alkali for the purpose of splitting off hydrogen halide.

According to another modification of the instant process, the bromine atom in 2-position of a dyestuff of the formula

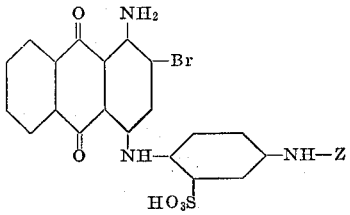

(4)

in which Z represents a monohalogenpropionyl or an acryl radical, can be replaced by a sulfo group by one of the usual methods, for example, with sodium sulfite.

The products of the Formula 1 obtained by the aforedescribed process or a modification thereof are new. They are valuable dyestuffs and are suitable for dyeing or printing a wide variety of materials, especially polyhydroxylated materials of fibrous structure, natural or regenerated cellulose, and nitrogenous textile materials, such as silk, and wool and synthetic fibers of polyamides or polyurethanes. They have good wet fastness properties and especially a very good leveling capacity which is of particular advantage for combination shades.

The dyestuffs of this invention can be applied to the fibers, for example, cellulose fibers, by the direct dyeing method, or by printing, or according to the so-called pad-dyeing method, and fixed thereon by a treatment with heat and alkali. To improve the fastness properties, it is advisable to rinse the resulting dyeings or prints thoroughly with cold and hot water, if necessary with the addition of a dispersing agent which enhances diffusion. The dyeings and prints obtained by these methods are distinguished by a particular purity of the shades, very good fastness to light and excellent fastness to wet treatments.

The following examples illustrate the invention. Unless otherwise stated, the parts and percentages are by weight.

EXAMPLE 1

40.9 parts of 1 - amino - 4-(4' - aminophenylamino)-anthraquinone-2-sulfonic acid are dissolved at room temperature in 290 parts of sulfuric acid having a free $SO_3$ content of 7.5%, and the solution is stirred for 20 hours at 40 to 45° C. The solution is then stirred into 1200 parts of an ice-cooled 25% sodium chloride solution, the precipitated dyestuff is filtered off, washed until neutral, and dried. A dark blue powder is obtained which dissolves in water to give a blue coloration, and in concentrated sulfuric acid to give a bordeaux-brown coloration, whereas the isomeric dyestuff which is sulfonated in 3' - position dissolves in concentrated sulfuric acid to give the blue coloration.

49 parts of the 1 - amino-4-(4' - aminophenylamino) anthraquinone-2,2' - disulfonic acid are dissolved in 500 parts of water containing 20 parts by volume of 10 N-sodium hydroxide solution to give a neutral solution. After the addition of 11 parts of sodium bicarbonate, 28 parts of α,β-dibromopropionyl chloride are slowly added dropwise while maintaining the reaction mixture at a temperature of below 20° C. by cooling. When acylation is complete, the dyestuff is salted out with sodium chloride, separated by filtration, and dried at 80 to 90° C. A dark blue powder is obtained which dissolves in water and dyes wool blue shades which are fast to wet treatments.

Dyestuffs having similar properties are obtained when the 28 parts of α,β-dibromopropionyl chloride are replaced by 13.5 parts of chloracetyl chloride or 11 parts of acryloyl chloride, the procedure being otherwise the same.

EXAMPLE 2

70.3 parts of the dibromopropionyl derivative obtainable according to the first two paragraphs of Example 1, are dissolved in 500 parts of water, the solution is cooled to 10° C. by an addition of ice, the pH adjusted to 12 to 13 with 12 parts by volume of 10 N-sodium hydroxide solution, the solution is stirred at 10–15° C. for 20 minutes, and then neutralized with about 10 parts by volume of 2 N-hydrochloric acid to pH 7. This procedure is followed by salting out with sodium chloride, and drying at 60 to 70° C. under reduced pressure. A water-soluble dyestuff is obtained which dyes wool blue shades that are very fast to wet treatments.

EXAMPLE 3

40.9 parts of 1-amino-4-(4' - aminophenylamino)-anthraquinone-2-sulfonic acid are dissolved in 800 parts of water with the addition of 10 parts by volume of 10 N-sodium hydroxide solution to give a neutral solution. To this solution is added dropwise in the course of one hour a solution of 14 parts of β-chloropropionyl chloride in 50 parts by volume of acetone, the reaction mixture being kept at a pH of 7.5 to 8.5 by the addition of 2N-sodium hydroxide solution. When the acylation is complete, the dyestuff is precipitated completely with sodium chloride, isolated by filtration, and dried at 80 to 90° C. 52.1 parts of the sodium salt of the dyestuff so obtained are dissolved at room temperature in 290 parts of sulfuric acid having a content of 7.5% of free $SO_3$, and the solution then stirred at 40 to 45° C. for 20 hours. The solution is then stirred into 1200 parts of an ice-cooled sodium chloride solution of 25% strength, the precipitated dyestuff is filtered off, washed until neutral, and dissolved in 500 parts of water. The solution is treated with 15 parts of a 10 N-sodium hydroxide solution, stirred at 36 to 40° C. for 1 hour, then neutralized to pH 7 with about 5 parts of a 30% hydrochloric acid solution. The dyestuff is precipitated completely by the addition of sodium chloride, isolated by filtration, and dried at 80 to 90° C. The resulting dyestuff dyes wool shades that are fast to wet treatments.

Dyestuffs having similar properties are obtained when instead of the β-chloropropionyl chloride a corresponding quantity of α,β-dichloropropionyl chloride, β-bromopropionyl chloride, α,β-dibromopropionyl chloride, acryloyl chloride, α,β-bromoacryloyl chloride, dichloroquinoxaline carboxylic acid chloride, dichloropyridazone-propionic acid chloride, or 2 - chlorobenzthiazolecarboxylic acid chloride is used.

The resulting dyestuffs give valuable dyings or prints also on cotton when used by the exhaust process or pad-dyeing process.

What is claimed is:
1. A dyestuff of the formula

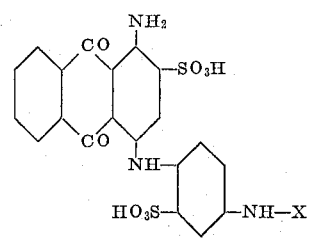

wherein X represents a member selected from the group consisting of a dibromopropionyl radical and a bromoacryl radical.

2. The dyestuff of the formula

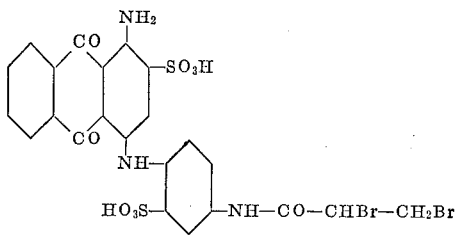

3. The dyestuff of the formula

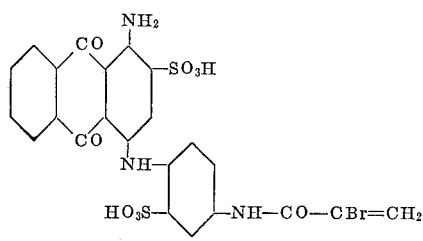

References Cited

UNITED STATES PATENTS

| | | |
|---|---|---|
| 2,952,690 | 9/1960 | Riat _____ 260—372 |
| 3,007,762 | 11/1961 | Wegmann et al. |
| 3,198,812 | 8/1965 | Krehbiel et al. _____ 260—372 |
| 3,316,239 | 4/1967 | Riat et al. _____ 260—372 XR |

FOREIGN PATENTS 989,192  4/1965  Great Britain.

LORRAINE A. WEINBERGER, Primary Examiner

H. C. WEGNER, Assistant Examiner

U.S. Cl. X.R.

8—39, 40; 260—262, 303

CASE 5804/E

PO-1050
(5/69)

UNITED STATES PATENT OFFICE
CERTIFICATE OF CORRECTION

Patent No. 3,501,505        Dated March 17, 1970

Inventor(s) ARTHUR BUEHLER ET AL

It is certified that error appears in the above-identified patent and that said Letters Patent are hereby corrected as shown below:

Column 5, line 2, after "of" delete "a" and substitute --- an α,β- ---; same line after "and" delete "a" and substitute --- an α- ---.

SIGNED AND
SEALED
MAR 2 1971

(SEAL)
Attest:

Edward M. Fletcher, Jr.
Attesting Officer

WILLIAM E. SCHUYLER, JR.
Commissioner of Patents